US009430182B2

(12) United States Patent
Kothandapani et al.

(10) Patent No.: US 9,430,182 B2
(45) Date of Patent: Aug. 30, 2016

(54) METHODS, SYSTEMS AND COMPUTER READABLE STORAGE DEVICES FOR PRESENTING SCREEN CONTENT

(71) Applicant: American Megatrends, Inc., Norcross, GA (US)

(72) Inventors: Govind Kothandapani, Snellville, GA (US); Vinothkumar Sundaramoorthy, Norcross, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 126 days.

(21) Appl. No.: 14/198,904

(22) Filed: Mar. 6, 2014

(65) Prior Publication Data

US 2015/0254047 A1    Sep. 10, 2015

(51) Int. Cl.
G09G 5/00    (2006.01)
G06F 3/14    (2006.01)

(52) U.S. Cl.
CPC ............. G06F 3/1454 (2013.01); G09G 5/005 (2013.01); *G09G 2358/00* (2013.01)

(58) Field of Classification Search
CPC ... G06F 3/1431; G06F 3/1454; G06F 3/1423
USPC .................. 345/2.1–2.3; 348/14.01; 709/217
See application file for complete search history.

(56) References Cited

U.S. PATENT DOCUMENTS

| 5,684,918 | A * | 11/1997 | Abecassis | ............... | A63F 13/10 348/14.01 |
| 6,996,828 | B1 | 2/2006 | Kimura et al. | | |
| 8,863,123 | B2 | 10/2014 | Jung | | |
| 2003/0037089 | A1 | 2/2003 | Cota-Robles | | |
| 2004/0123103 | A1 | 6/2004 | Risan et al. | | |
| 2005/0015702 | A1 | 1/2005 | Shier et al. | | |
| 2006/0146057 | A1 | 7/2006 | Blythe | | |
| 2006/0150183 | A1 | 7/2006 | Chinya et al. | | |
| 2006/0206904 | A1 | 9/2006 | Watkins | | |
| 2007/0294690 | A1 | 12/2007 | Taillefer | | |
| 2007/0300221 | A1 | 12/2007 | Hartz | | |
| 2008/0235012 | A1* | 9/2008 | Gibbon | ................... | G10L 15/26 704/231 |

(Continued)

OTHER PUBLICATIONS

WiFi Certified Miracast (TM), http://www.wi-fi.org/wi-fi-certified-miracast%E2%84%A2, 2pp (Printed Feb. 24, 2014).

(Continued)

*Primary Examiner* — Kimnhung Nguyen
(74) *Attorney, Agent, or Firm* — Gardner Groff Greenwald & Villanueva, P.C.

(57) ABSTRACT

Screen content associated with a first communication device is presented on a screen associated with a second communication device with minimal processing of the screen content by the first communication device. Screen content associated with the first communication device that is to be presented on the screen associated with a second communication device is identified. The first communication device determines whether the identified content requires complex processing for presentation on the screen associated with the second communication device. If the identified content requires complex processing for presentation on the screen associated with the second communication device, the first communication device sends a representation of the identified content to the second communication device, and the second communication device accesses and processes the identified content for presentation on the screen associated with the second communication device.

20 Claims, 2 Drawing Sheets

(56) References Cited

U.S. PATENT DOCUMENTS

| | | | |
|---|---|---|---|
| 2009/0083630 A1 | 3/2009 | Peterson | |
| 2009/0328074 A1 | 12/2009 | Oshins | |
| 2010/0107163 A1 | 4/2010 | Lee | |
| 2010/0293246 A1* | 11/2010 | Urazoe | G06F 21/6218 709/217 |
| 2011/0061053 A1 | 3/2011 | Coppinger | |
| 2011/0093836 A1 | 4/2011 | Galicia et al. | |
| 2012/0089992 A1 | 4/2012 | Reeves | |
| 2012/0124595 A1 | 5/2012 | Hsu | |
| 2012/0246693 A1* | 9/2012 | Iqbal | H04N 21/4126 725/141 |
| 2013/0031592 A1 | 1/2013 | Choi | |
| 2013/0061250 A1 | 3/2013 | Kothandapani et al. | |
| 2013/0185716 A1 | 7/2013 | Yin | |
| 2013/0219086 A1 | 8/2013 | Hu | |
| 2013/0293662 A1* | 11/2013 | Moran | H04N 7/147 348/14.01 |
| 2014/0052872 A1* | 2/2014 | Varoglu | H04L 65/4084 709/231 |
| 2014/0181851 A1* | 6/2014 | Givon | H04N 21/25891 725/16 |

OTHER PUBLICATIONS

Kothandapani et al., U.S. Appl. No. 14/155,471, "Methods, Devices and Computer Readable Storage Devices for Confluence of Multiple Operating Systems", filed Jan. 15, 2014.

Architecture of Windows NT, http:f/en.widipedia.orgfwiki/Architecture_of_Windows_NT, 9pp (Printed Aug. 9, 2011).

Android Architecture, htlp:/Jblog.zeustek.com/2010111/11/android-architeclure, 6pp (Printed Jul. 14, 2011).

Ammann, Paul T., "Windows 2000 Architecture", www.informit.com/articles, 3pp (Apr. 13, 2011).

Wright, Maury, "Why Android Deserves a Look in Embedded Wireless Systems", www.digikey.com, 2pp (Printed Jul. 1, 2011).

Levent-Levi, Tsahi, "iOS, Android, Windows Phone 7 and the Great Changes in the Operating Systems Market", https://blog.radvision.comlvoipsurvivor, 5pp {Oct. 7, 2010).

Samsung Strengthens Table! Business and Demonstrates Commitment to Customer Choice with Innovative New ATIV Tablets, www.samsung.com, 2pp {Jun. 21, 2013).

SlueStacks—Technology, www.bluestacks.com/technology, 3pp (Printed Jul. 15, 2013).

Woods, Ben, "Hands-on with Samsung's hybrid Windows 8 and Android Galaxy ATIV Q", http://thenextweb.com, 3pp (Jun 21, 2013).

Song, "The Design of Bottom Layer Sensor Interfaces Based on Andriod OS", 2012 4th International Conference on Signal Processing Systems, Singapore (Song_2012.pdf; pp. 1-7).

Zores, "Jelly Bean Device Porting Walkthrough" Alcatel-Lucent, Feb. 18, 2013, (Alcatel-Lucent 2013.pdf; pp. 1-127).

Kaur, et al.; "Exposing the Android Camera Stack" Aptina Imaging Corporation Aug. 28, 2012; (Kaur_2012.pdf; pp. 1-68).

STMicroelectronics; "Hardware abstraction layer for Android", Sep. 2012; (Sensor_HAL_2012.pdf; pp. 1-12).

* cited by examiner

METHODS, SYSTEMS AND COMPUTER READABLE STORAGE DEVICES FOR PRESENTING SCREEN CONTENT

TECHNICAL FIELD

The present disclosure relates generally to telecommunications, and, more particularly, to presenting screen content from one communication device on a screen associated with another communication device.

BACKGROUND

Today's smart wireless cellular telephones ("smartphones") are typically equipped with memory and processing capabilities that allow this category of devices to provide significant functionality. For instance, today's smartphones typically provide functionality for sending and receiving electronic mail messages ("e-mail"), browsing the World Wide Web ("the Web"), interacting with social networking services, capturing and viewing digital photographs, viewing documents, viewing and listening to multimedia content, such as movies, etc.

Although smartphones may provide functionality for viewing and listening to multimedia content, these devices have small screens with limited resolution. Also, the speakers included in smartphones are typically somewhat limited in terms of sound quality.

Due to their small screens, smartphones are generally not utilized to share content or to present content to groups of people. The small screens make sharing content with more than a few other people inconvenient at best.

Moreover, smartphones are typically not equipped with an external video output for connection to a projector or other type of external display device. As a result, smartphone users that want to share multimedia content with a group of people are typically required to use another device that is equipped with an external video output, such as a desktop or laptop computer, to output the content to an external display device. This can be inconvenient and impractical in some situations, such as for users that travel significantly and do not want to carry multiple devices.

Attempts have been made to transmit screen content from a smartphone to a device having a larger display, such as a laptop. However, processing of the screen content to put it in a format for display on the larger display is typically performed in the smartphone. This puts a heavy burden on the smartphone, resulting in a slow response time, weak performance, and battery drainage. In addition, in order to display content received from a smartphone on a device with a larger display, the smartphone and the device typically have to be equipped with the same or compatible operating systems.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method is provided for presenting screen content associated with a first communication device on a screen associated with a second communication device. The method comprises identifying, by the first communication device, content to present on the screen associated with the second communication device. The method further comprises determining, by the first communication device, whether the identified content requires complex processing for presentation on the screen associated with the second communication device. Responsive to determining that the identified content requires complex processing for presentation on the screen associated with the second communication device, a representation of the identified content is sent to the second communication device. The second communication device accesses the identified content using the representation of the identified content and processes the identified content for presentation on the screen associated with the second communication device. Responsive to determining that the identified content does not require complex processing for presentation on the screen associated with the second communication device, the first communication device processes the identified content and sends the processed identified content to the second communication device for presentation on the screen associated with the second communication device.

According to another embodiment, a system is provided for presenting screen content associated with a first communication device on a screen associated with a second communication device. The system includes a processor and a memory. The memory has instruction stored thereon which, when executed by the processor, cause the processor to perform operations. The operations include identifying content associated with the first communication device to present on the screen associated with the second communication device and determining whether the identified content requires complex processing for presentation on the screen associated with the second communication device. Responsive to determining that the identified content requires complex processing for presentation on the screen associated with the second communication device, the instructions cause the processor to output a representation of the identified content to send to the second communication device. The second communication device accesses the identified content using the representation of the identified content and processes the identified content for presentation on the screen associated with the second communication device. Responsive to determining that the identified content does not require complex processing for presentation on the screen associated with the second communication device, the instructions cause the processor to process the identified content and output the processed identified content to send to the second communication device for presentation on the screen associated with the second communication device.

According to another embodiment, a computer readable storage device has stored thereon instruction which, when executed by a processor, cause the processor to perform operations for presenting content associated with a first communication device on a screen associated with a second communication device. The operations include identifying content associated with the first communication device to present on the screen associated with the second communication device and determining whether the identified content requires complex processing for presentation on the screen associated with the second communication device. Responsive to determining that the identified content requires complex processing for presentation on the screen associated with the second communication device, the instructions cause the processor to output a representation of the identified content to send to the second communication device. The second communication device accesses the identified content using the representation of the identified content and processes the identified content for presentation on the screen associated with the second communication device. Responsive to determining that the identified content does not require complex processing for presentation on the screen associated with the second communication device, the instructions cause the processor to process the identified content and output the processed identified content to send to the second communication device for presentation on the screen associated with the second communication device.

DETAILED DESCRIPTION

Detailed illustrative embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1:
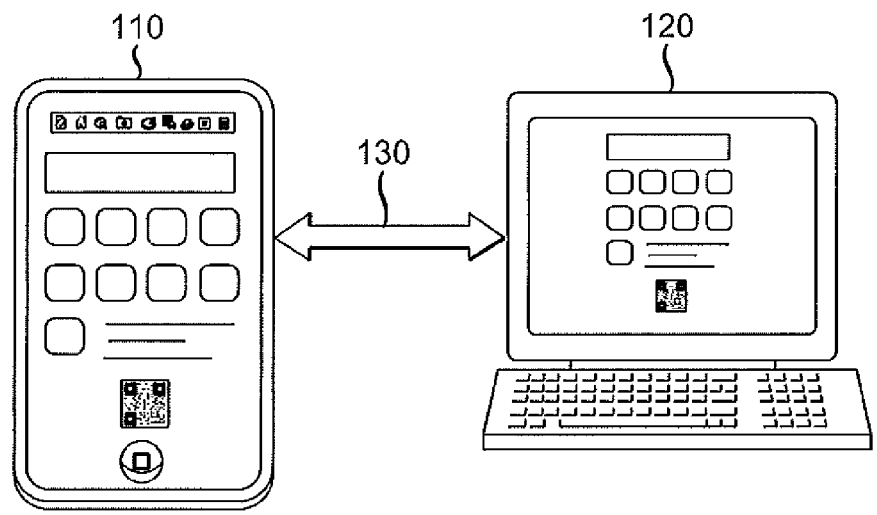
FIG. 1 illustrates an illustrative environment in which screen content associated with a first communication device may be presented on a screen associated with a second communication device.

FIG. 1 illustrates an environment in which screen content associated with a first communication device may be processed for presentation on a screen associated with a second communication device according to an illustrative embodiment. Referring to FIG. 1, processed screen content and/or a representation of screen content associated with a first communication device 110, e.g., a smartphone, may be sent wirelessly to a second communication device 120, such as a personal computing device, a television equipped with Wi-Fi, an onboard vehicle navigation system, etc. The screen content is "associated" with the first communication device 110 in the sense that it may be stored in the first communication device 110 and/or may otherwise be made accessible by the first communication device, e.g., by the first communication device 110 obtaining a link to the screen content. The representation of screen content may include actual raw screen content stored within the communication device 110. Alternatively, the representation of the screen content may include a link to screen content, e.g., a Universal Resource Locator (URL), which may be obtained by and stored temporarily in the first communication device 110.

The screen content and/or the representation of the screen content may be sent via a connection 130, which may include e.g., a Bluetooth connection, a Wi-Fi connection, an Internet over cellular network connection, such as GPRS, 3G, LTE, etc., or any other wireless connections suitable for transfer of screen content. To provide for transmission outside of WiFi range, a Wireless Access Point (WAP) mode may be supported.

The screen content may include static and/or dynamic content including video and/or audio content. The screen content may be encoded based on whether the content is static or dynamic. Also, the screen content may be encrypted, e.g., via real-time encryption or zip encryption, for security.

According to an illustrative embodiment, processing of the screen content for presentation on a screen associated with the second communication device 120 occurs in either or both of the first communication device 110 and the second communication device 120, depending upon the complexity of processing required to render the screen content on the screen associated with the communication device 120. That is, if the screen content is identified by the first communication device 110 as requiring complex processing for screen rendering, a representation of the screen content, a link to the screen content, may be sent to the communication device 120 for accessing the screen content for processing the screen content for presentation on the screen associated with the second communication device 120. Instead of a link, the representation of the screen content may include unprocessed screen content. If the screen content is not identified as requiring complex processing, the screen content may be processed by the first communication device 110 for rendering on the screen associated with the second communication device 120, and the processed screen content may be sent to the second communication device 120.

It should be appreciated that, although the second communication device 120 is shown as including a screen on which content associated with the first communication device 110 may be presented, the content may be presented on a screen that is not integrated within the second communication device 120 but is otherwise associated with the communication device. For example, the screen content and/or a representation of the screen content may be sent from the communication device 110, processed for rendering by the second communication device 120, and presented on a screen connected by a wireline or wireless connection to the second communication device 120. Thus, for the purposes of this disclosure, the terminology "screen associated with the second communication device 120" may include a screen integrated within the second communication device 120 or a screen in communication with the second communication device 120.

In addition, for the purposes of this disclosure, screen content that requires complex processing may include but is not limited to graphic-intensive content, e.g., three-dimensional Open Graphics Library (GL) content, multimedia content including rich audio and video content, etc. Such complex processing is offloaded to the second communication device 120. Screen content that does not require complex processing for rendering may include simple video content, e.g., two-dimensional video, a black and white photograph, short audio and/or video clips, small documents, simple text, etc. Such processing may be performed by the first communication device 110.

According to an illustrative embodiment, the first communication device 110 may determine whether screen content that is selected to be displayed on the screen associated with the second communication device 120 includes three-dimensional content and/or audio/video content that requires decoding. Such content is considered to require complex processing. Upon recognizing that the selected screen content contains such content, the first communication device 110 may send the screen content to the second communication device 120 for processing.

According to an illustrative embodiment, content that requires complex processing may be predefined such that when such content is selected, e.g., by a user of the first communication device 110, to be sent to the second communication device 120 for display on the screen associated with the second communication device 120, the first communication device 110 automatically sends a representation of the screen content to be sent to the second communication device 120 without processing the screen content for display. For example, the first communication device 110 may store a list of types of content that require complex processing, e.g, three-dimensional graphics, movies, etc. When content associated with the first communication device 110 is selected to be presented on the screen associated with the second communication device 120, the first communication device 110 may determine the type of content, e.g., by examining a content header, and consult the list. If the content is of a type on the list, a representation of the screen content, e.g., a link to the content, may be sent to the second communication device 120 for accessing the content and processing the content for presentation on the screen.

As an illustrative example, consider a user of a smartphone who desires to download a movie and view it on a large screen, e.g., a screen of a web-equipped television in a hotel room. The smartphone may receive a link to the screen content, e.g., a URL. The smartphone may recognize the URL as being a link to screen content that requires complex processing. Accordingly, the smartphone transmits the link to the web-equipped television for rendering, rather than opening the URL and performing rendering before passing the screen content onto the web-equipped television. As an alternative, the smartphone may be directed to transmit the link to the web-equipped television without determining whether the screen content associated with the URL contains content requiring complex processing. In either case, the link is opened by the web-equipped television, and the screen content associated with the link is processed and presented on the web-equipped television as part of a session. When the user of the smartphone leaves, the session ends, and the smartphone content does not stay on the television.

According to another embodiment, a representation of screen content may be sent to the second communication device 120, whether or not the screen content is determined to be of a type that requires complex processing.

As an illustrative example, consider a user with a smartphone who wishes to view navigation information on a large display of a vehicle navigation system in a rental car, rather than trying to view the small screen of the smartphone while driving. In this instance, the user may indicate that non-secure screen content of the smartphone be offloaded to the on-board vehicle navigation system for processing and display as part of a session. When the user returns the rental car and the session ends, the screen content does not remain on the vehicle navigation system.

According to illustrative embodiments, screen content associated with the first communication device 110 is presented on a screen associated with the second communication device 120 as part of a session. Once the session is over, the screen content and any other information regarding the first communication device 110 is not retained by the second communication device. Thus, for example, referring to the web-equipped television and rental car navigation system examples above, information associated with the smartphone is not retained once the session for presenting the screen content ends. The beginning and ending of the session may be controlled, e.g., by the first communication device 110, e.g., responsive to user input.

According to one embodiment, screen content that does not require complex processing for rendering on the screen of the second communication device 120 is processed by the first communication device 110, and screen content that does require complex processing is processed by the second communication device 120. As an alternative, all of the screen content to be rendered for presentation on the screen of the second communication device 120 may be processed by the second communication device 120.

Data stored within the first communication device 110 that is not to be presented on the screen of the second communication device 120, such as usernames, passwords, and other secure content may be preserved within the memory of the first communication device 110 and not be sent to the second communication device 120. For example, some part of the header information included within the screen content which is deemed secure may be taken out, for safety/security reasons, before the screen content is accessed by the second communication device 120. Thus, according to illustrative embodiments, a user of a communication device, such as a smartphone, may enjoy a "native" experience on a larger display while secure information is preserved.

According to an illustrative embodiment, the operating system of the first communication device 110 may be different than the operating system of the second communication device 120. For example, the first communication device 110 may include an Android operating system, while the second communication device 120 may include a Windows operating system. Though the operating systems are different, the screen content from the first communication device 110 may still be processed by the second communication device 120 using techniques described, e.g., in co-pending U.S. patent application Ser. No. 14/155,471 filed Jan. 15, 2014, herein incorporated by reference.

Processed screen content and/or a representation of screen content (e.g., a link to screen content or unprocessed screen content) may be sent over the wireless connection 130 and may be transmitted, e.g., streamed, to the second communication device 120 as illustrated in FIG. 1. The screen content may be presented in substantially real time on a screen associated with the second communication device 120.

Alternatively, processed screen content and/or a representation of screen content may be transmitted to an intermediate storage device (not shown for simplicity of illustration) for long time preservation and easy access from the Internet. The stored processed screen content or representation of the screen content may be retrieved from the memory and transmitted to the second communication device 120 at any suitable time, as determined by a user of the communication device 110 and/or second the communication device 120.

As yet another alternative, the received processed screen content or representation of screen content may be stored in memory in the second communication device 120 until an appropriate time for processing and presenting the content, which may be determined by a user of the first communication device 110 and/or the second communication device 120.

According to one embodiment, transmission of processed screen content and/or a representation of screen content is performed in one direction, from the first communication device 110 to the second communication device 120, to ensure secure communications.

According to an illustrative embodiment, the first communication device 110 includes an application for wirelessly sending processed screen content and/or a representation of the screen content. The application may be launched, e.g., when the first communication device 110 is turned on or at any other desired time, e.g., responsive to user input.

Similarly, the second communication device 120 may include an application for receiving processed screen content and/or a representation of screen content and accessing and processing the screen content as appropriate for display on a screen associated with the second communication device 120. The application may be launched when the second communication device 120 is turned on or at any desired time, e.g., responsive to user input. Once the application is launched, the second communication device 120 is capable of receiving processed screen content and/or a representation of screen content from the first communication device 110 and accessing and processing the screen content for display.

According to an illustrative embodiment, complex processing of screen content by the second communication device 120 may include, e.g., decoding, decrypting, etc. In addition, the second communication device 120 may also perform any formatting necessary to enable the screen content to be presented on the screen associated with the second communication device 120. For example, the size/resolution of video content obtained from the first communication device 110 may not fit the screen display of second communication device 120. Accordingly, the video content may be resized, or the resolution may be adjusted so that the video content may be displayed on the screen associated with the second communication device 120. Also, for screen content including video content and audio content, such formatting may include synchronizing the video content and the audio content. Once formatting, decryption and decoding are performed, the screen content may be presented on the screen associated with the second communication device 120.

Although only one second communication device 120 is shown in FIG. 1 as an example of a device for presenting screen content associated with the first communication device 110, it should be appreciated that screen content associated with the first communication device 110 may be presented on any number or type of devices capable of receiving and/or processing screen content for display. For example, screen content and/or a representation of screen content may be sent from the first communication device 110 to a transceiver that does not process the screen content or representation thereof but is capable of transmitting the screen content and representation thereof to other devices for processing.

According to an illustrative embodiment, there may be a minimal lag (e.g., around a second) between transmission of the screen content and/or representation of the screen content and the presentation of the screen content on the screen associated with the second communication device 120. This lag depends, e.g., on the connection speed between the communication devices 110 and 120.

As noted above, it should be appreciated that the "screen content" may include not only video data but also audio data that may be presented, e.g., played, in conjunction with presentation, e.g., display, of the video data. Examples of screen content associated with the first communication device 110 that may be presented on a screen associated with the second communication device 120 include but are not limited to a static screen shot, a webcam feed, text/ecard/chat, a whiteboard, a file, a movie, three-dimensional graphics, etc.

Figure 2:
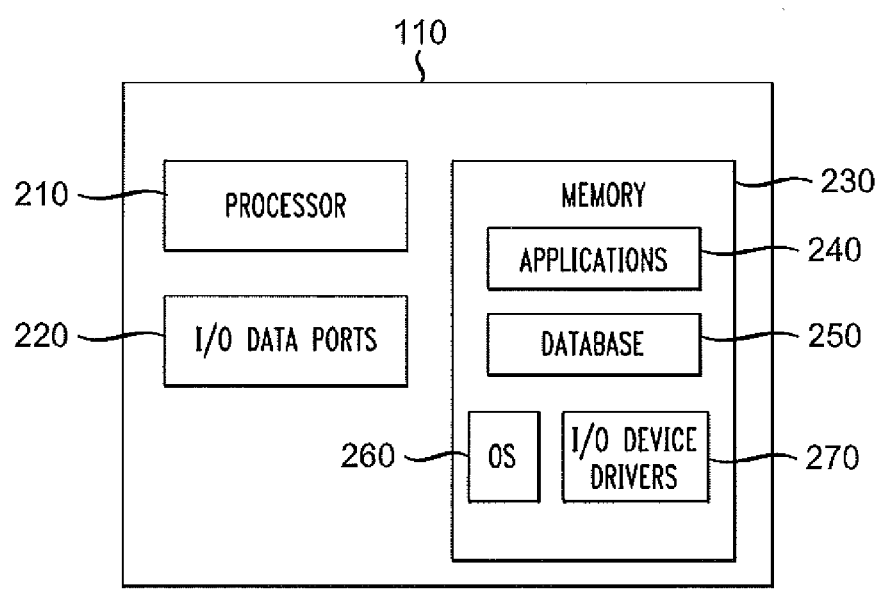
FIG. 2 illustrates a computing device which may be included within a first communication device for identifying screen content to be presented on a screen associated with a second communication device, according to an illustrative embodiment.

FIG. 2 is a block diagram of a computing device which may be included within a first communication device for identifying screen content to be presented on a screen associated with a second communication device according to an illustrative embodiment. According to an illustrative embodiment, the device 200 includes a processor 210 that executes instructions stored within a memory 230, e.g., in the form of applications 240. The device 200 includes I/O Data Ports 220 for outputting screen content and/or a representation of screen content to the second communication device 120. The I/O Data Ports 220 can be implemented with, e.g., an interface including an antenna or other suitable type of transceiver through which data and signals may be transmitted and received wirelessly. It should be appreciated that the I/O Data Ports 220 can be used for communications between a device, such as a smartphone, and various telecommunications devices via wireless connections, such as that shown in FIG. 1.

The processor 210 communicates with the memory 230 via, e.g., an address/data bus. The processor 210 can be any commercially available or customer microprocessor. The memory is 230 is representative of the overall hierarchy of memory devices containing the software and data used to implement the functionality of the device 200. The memory 230 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like, excluding propagating signals.

As shown in FIG. 2, the memory 230 may include several categories of software and data used in the device 200, including, applications 240, a database 250, an operating system (OS) 260, and the input/output (I/O) device drivers 270. As will be appreciated by those skilled in the art, the OS 260 may be any operating system for use with a data processing system. According to an illustrative embodiment, the OS 260 is an Android operating system.

The I/O device drivers 270 may include various routines accessed through the OS 260 by the applications 240 to communicate with devices, and certain memory components. The applications 240 can be stored in the memory 230 and/or in a firmware (not shown) as executable instructions, and can be executed by the processor 210. The applications 240 include various programs that implement the various features of the device 200, including, e.g., applications for identifying screen content that requires complex processing for rendering on a screen associated with the second communication device 120, applications for processing screen content (including decrypting, decoding, formatting, etc.), applications for transmitting processed screen content and/or a representation of screen content to the second communication device 120, etc.

The database 250 represents the static and dynamic data used by the applications 240, the OS 260, the I/O device drivers 270 and other software programs that may reside in the memory. The database 250 may store, for example, screen content as well as a list indicating types of content that require complex processing.

While the memory 230 is illustrated as residing proximate the processor 210, it should be understood that at least a portion of the memory 230 can be a remotely accessed storage system, for example, a server on a communication network, a remote hard disk drive, a removable storage medium, combinations thereof, and the like. Thus, any of the data, applications, and/or software described above can be stored within the memory 230 and/or accessed via network connections to other data processing systems (not shown) that may include a local area network (LAN), a metropolitan area network (MAN), or a wide area network (WAN), for example.

Although the description of FIG. 2 is directed to a computing device which may be included in the first communication device 110, it should be appreciated that the second communication device 120 may include similar components, e.g., a memory storing instructions as applications and a processor for executing the instructions for receiving screen content and/or a representation of screen content associated with the first communication device and processing the screen content for presentation on a screen associated with the second communication device 120.

According to an illustrative embodiment, the second communication device 120 may include an operating system that is different from the operating system of the first communication device 110. For example, the second communication device 120 may include a Windows operating system.

Further, it should be appreciated that the first communication device 110 and the second communication device 120 may include additional components, e.g., a camera, a microphone, a speaker, etc., which are not described in detail in the interest of simplicity of explanation and illustration.

It should be understood that FIG. 2 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 3:
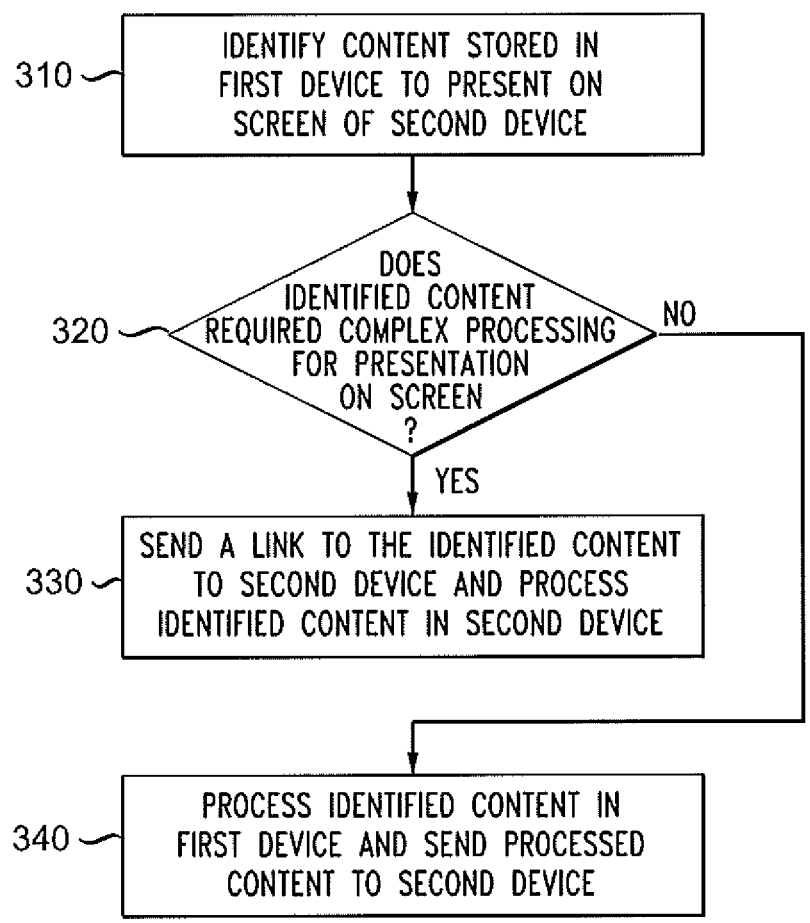
FIG. 3 is a flow chart illustrating a method for presenting screen content associated with a first communication device on a screen associated with a second communication device according to an illustrative embodiment.

FIG. 3 is a flow chart illustrating a method for presenting screen content according to an illustrative embodiment. The method begins at step 310 at which content associated with a first communication device, e.g., the first communication device 110 to present on the screen associated with a second communication device, e.g., the communication device 120 is identified. The content may be identified by the first communication device 110, e.g., responsive to user selection of the content via a user interface on the first communication device 110.

At step 310, the first communication device 110 determines whether the identified content requires complex processing for presentation on the screen associated with the communication device 120.

If, at step 320, the identified content is determined to require complex processing for presentation on the screen associated with the communication device 120, at step 330 a representation of the identified content, e.g., a link, is sent to the second communication device 120. The second communication device 120 accesses the identified content using the representation of the identified content and processes the identified content for presentation on the screen associated with the second communication device 120.

If, at step 320, the identified content is determined not to require complex processing for presentation on the screen associated with the second communication device 120, at step 340 the identified content is processed by the first communication device 110 and sent to the second communication device 120 for presentation on the screen associated with the second communication device 120.

The law does not require and it is economically prohibitive to illustrate and teach every possible embodiment of the present claims. Hence, the above-described embodiments are merely illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   identifying, by a first communication device, content to present on a screen associated with a second communication device;
   determining, by the first communication device, whether the identified content requires complex processing for presentation on the screen associated with the second communication device; and
   responsive to determining that the identified content requires complex processing for presentation on the screen associated with the second communication device, sending a representation of the identified content to the second communication device instead of processing and sending the identified content, wherein the second communication device accesses the identified content using the representation of the identified content and processes the identified content for presentation on the screen associated with the second communication device.

2. The method of claim 1, further comprising, responsive to determining that the identified content does not require complex processing for presentation on the screen associated with the second communication device:
   processing, by the first communication device, the identified content; and
   sending the processed identified content to the second communication device for presentation on the screen associated with the second communication device.

3. The method of claim 1, wherein the first communication device is a smartphone.

4. The method of claim 1, wherein the first communication device includes a first operating system that is different from a second operating system included within the second communication device.

5. The method of claim 1, further comprising identifying secure content stored within the first communication device, wherein the secure content is not sent from the first communication device to the second communication device.

6. The method of claim 1, wherein the identified content that requires complex processing includes at least one of graphic-intensive content and multimedia audio/video content, and content that does not require complex processing includes at least one of two-dimensional video, short audio and/or video clips, small documents, and simple text.

7. The method of claim 1, wherein the representation of the identified content includes a hyperlink.

8. A system, comprising;
a processor; and
a memory having stored thereon instructions which, when executed by the processor, cause the processor to perform operations comprising:
identifying content associated with a first communication device to present on a screen associated with a second communication device;
determining whether the identified content requires complex processing for presentation on the screen associated with the second communication device;
responsive to determining that the identified content requires complex processing for presentation on the screen associated with the second communication device, outputting a representation of the identified content to send to the second communication device instead of processing and outputting the identified content, wherein the second communication device accesses the identified content using the representation of the identified content and processes the identified content for presentation on the screen associated with the second communication device.

9. The system of claim 8, wherein the instructions, when executed by the processor, further cause the processor to perform, responsive to determining that the identified content does not require complex processing for presentation on the screen associated with the second communication device:
processing the identified content; and
outputting the processed identified content to send to the second communication device for presentation on the screen associated with the second communication device.

10. The system of claim 8, wherein the first communication device is a smartphone.

11. The system of claim 8, wherein the first communication device includes a first operating system that is different from a second operating system included within the second communication device.

12. The system of claim 8, wherein the instructions, when executed by the processor, further cause the processor to perform identifying secure content stored within the first communication device, wherein the secure content is not sent from the first communication device to the second communication device.

13. The system of claim 8, wherein the identified content that requires complex processing includes at least one of graphic-intensive content and multimedia audio/video content, and content that does not require complex processing includes at least one of two-dimensional video, short audio and/or video clips, small documents, and simple text.

14. The system of claim 8, wherein the representation of the identified content includes a hyperlink.

15. A non-transitory computer readable storage device having stored thereon instruction which, when executed by a processor, cause the processor to perform operations comprising:
identifying content associated with a first communication device to present on a screen associated with a second communication device;
determining whether the identified content requires complex processing for presentation on the screen associated with the second communication device;
responsive to determining that the identified content requires complex processing for presentation on the screen associated with the second communication device, outputting a representation of the identified content to send to the second communication device instead of processing and outputting the identified content, wherein the second communication device accesses the identified content using the representation of the identified content and processes the identified content for presentation on the screen associated with the second communication device.

16. The non-transitory computer readable storage device of claim 15, wherein the instructions, when executed by the processor, further cause the processor to perform, responsive to determining that the identified content does not require complex processing for presentation on the screen associated with the second communication device:
processing the identified content; and
outputting the processed identified content to send to the second communication device for presentation on the screen associated with the second communication device.

17. The non-transitory computer readable storage device of claim 15, wherein the first communication device is a smartphone.

18. The non-transitory computer readable storage device of claim 15, wherein the first communication device includes a first operating system that is different from a second operating system included within the second communication device.

19. The non-transitory computer readable storage device of claim 15, wherein the instructions, when executed by the processor, further cause the processor to perform identifying secure content stored within the first communication device, wherein the secure content is not sent from the first communication device to the second communication device.

20. The non-transitory computer readable storage device of claim 15, wherein the identified content that requires complex processing includes at least one of graphic-intensive content and multimedia audio/video content, and content that does not require complex processing includes at least one of two-dimensional video, short audio and/or video clips, small documents, and simple text and wherein the representation of the identified content includes a hyperlink.

* * * * *